(12) United States Patent
Horiuchi et al.

(10) Patent No.: US 12,730,474 B2
(45) Date of Patent: Sep. 8, 2026

(54) ELECTRONIC APPARATUS

(71) Applicant: Lenovo (Singapore) Pte. Ltd., Singapore (SG)

(72) Inventors: Shigehiro Horiuchi, Kanagawa (JP); Mamoru Okada, Kanagawa (JP); Markus Takashi Heberlein, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 128 days.

(21) Appl. No.: 18/780,113

(22) Filed: Jul. 22, 2024

(65) Prior Publication Data

US 2025/0076920 A1 Mar. 6, 2025

(30) Foreign Application Priority Data

Aug. 28, 2023 (JP) ................................ 2023-138007

(51) Int. Cl.
*G06F 1/16* (2006.01)
*F16C 11/04* (2006.01)
*G06F 3/0354* (2013.01)

(52) U.S. Cl.
CPC ............ *G06F 1/1607* (2013.01); *F16C 11/04* (2013.01); *G06F 3/03545* (2013.01)

(58) Field of Classification Search
CPC combination set(s) only.
See application file for complete search history.

(56) References Cited

U.S. PATENT DOCUMENTS 11,281,254 B2 * 3/2022 Lee ....................... G06F 1/1681
11,402,873 B2 * 8/2022 Meng .................... G06F 1/1607
11,531,405 B2 * 12/2022 Thome .................... G06F 1/169
11,538,370 B2 * 12/2022 Kim ........................ G09F 9/301
11,714,451 B2 * 8/2023 Lee ..................... G06F 3/03545 361/679.01
11,893,171 B2 * 2/2024 Wang .................. G06F 3/03547
12,277,012 B1 * 4/2025 Haworth ............... G06F 1/1656
12,298,804 B2 * 5/2025 Zhang ..................... H02J 50/90
12,524,041 B2 * 1/2026 Maclean ............... G06F 1/1632
2022/0171474 A1 * 6/2022 Wang ...................... G06F 3/038
(Continued)

FOREIGN PATENT DOCUMENTS

JP 2015-191153 A 11/2015
JP 2018-13969 A 1/2018
(Continued)

*Primary Examiner* — Lisa Lea-Edmonds
(74) *Attorney, Agent, or Firm* — Osha Bergman Watanabe & Burton LLP

(57) ABSTRACT

An electronic apparatus includes: a chassis including a first chassis having a first facing surface and a second chassis having a second facing surface; a first magnetic attraction portion provided in the first chassis and configured to magnetically attract a pen-shaped device to a first attraction position of the first chassis; and a second magnetic attraction portion provided in the second chassis and configured to magnetically attract the pen-shaped device to a second attraction position of the second chassis. A posture of the chassis is switchable between a closed posture in which the first facing surface and the second facing surface face each other and an open posture in which the first facing surface and the second facing surface do not face each other.

5 Claims, 6 Drawing Sheets

(56) References Cited

U.S. PATENT DOCUMENTS

| | | | | |
|---|---|---|---|---|
| 2022/0206531 | A1* | 6/2022 | Lee | G06F 1/169 |
| 2024/0313588 | A1* | 9/2024 | Zhang | G06F 3/03545 |
| 2025/0004499 | A1* | 1/2025 | Zhang | G01R 33/072 |
| 2025/0076920 | A1* | 3/2025 | Horiuchi | G06F 1/1616 |

FOREIGN PATENT DOCUMENTS

| | | | |
|---|---|---|---|
| JP | 2020-21227 | A | 2/2020 |
| JP | 2020-87044 | A | 6/2020 |
| JP | 2021-51556 | A | 4/2021 |
| WO | 2023/061070 | A1 | 4/2023 |

* cited by examiner

ELECTRONIC APPARATUS

CROSS-REFERENCE TO RELATED APPLICATIONS

This application claims priority to Japanese Patent Application No. 2023-138007 filed on Aug. 28, 2023, the contents of which are hereby incorporated herein by reference in their entirety.

TECHNICAL FIELD

The present invention relates to an electronic apparatus.

BACKGROUND

Japanese Unexamined Patent Application Publication No. 2020-21227 discloses an electronic apparatus to which a pen-shaped device can be attached by a magnetic force.

According to the inventors of the present invention, for example, in the electronic apparatus of JP2015-191153A, there is room for improvement in an attachment structure in which the pen-shaped device is attached by a magnetic force.

SUMMARY

The present invention has been made in consideration of such circumstances, and an object of the present invention is to provide an electronic apparatus in which an attachment structure for attaching a pen-shaped device by a magnetic force can be improved.

One or more embodiments of the present invention relates to an electronic apparatus including: a chassis including a first chassis having a first facing surface and a second chassis having a second facing surface; a first magnetic attraction portion provided in the first chassis and configured to magnetically attract a pen-shaped device to a first attraction position of the first chassis; and a second magnetic attraction portion provided in the second chassis and configured to magnetically attract the pen-shaped device to a second attraction position of the second chassis, in which a posture of the chassis is switchable between a closed posture in which the first facing surface and the second facing surface face each other and an open posture in which the first facing surface and the second facing surface do not face each other, and in a case in which the posture of the chassis is changed from the open posture to the closed posture in a state in which the pen-shaped device is magnetically attracted to the first attraction position, the pen-shaped device leaves the first attraction position and moves to the second attraction position.

One or more embodiments of the present invention can provide the electronic apparatus in which the attachment structure for attaching the pen-shaped device by the magnetic force can be improved.

One or more embodiments of the present invention relates to the electronic apparatus according to the above-described embodiments, in which the first chassis has a first back surface located on a side opposite to the first facing surface, the second chassis has a second back surface located on a side opposite to the second facing surface, the posture of the chassis is switchable among the open posture, the closed posture, and a fully open posture in which the first back surface and the second back surface face each other, and in a case in which the posture of the chassis is changed from the open posture to the fully open posture in a state in which the pen-shaped device is magnetically attracted to the first attraction position, the pen-shaped device leaves the first attraction position and moves to the second attraction position.

One or more embodiments of the present invention can provide the electronic apparatus in which the attachment structure can be further improved.

One or more embodiments of the present invention relates to an electronic apparatus including: a chassis including a first chassis having a first facing surface and a second chassis having a second facing surface; a first magnetic attraction portion provided in the first chassis and configured to generate a magnetic force; and a second magnetic attraction portion provided in the second chassis and configured to generate a magnetic force, in which a posture of the chassis is switchable between a closed posture in which the first facing surface and the second facing surface face each other and an open posture in which the first facing surface and the second facing surface do not face each other, the magnetic force generated by the second magnetic attraction portion is larger than the magnetic force generated by the first magnetic attraction portion, and in a case in which the posture of the chassis is the closed posture, the first magnetic attraction portion and the second magnetic attraction portion are adjacent to each other in a direction in which the first facing surface and the second facing surface face each other.

One or more embodiments of the present invention can provide the electronic apparatus in which the attachment structure for attaching the pen-shaped device by the magnetic force can be improved.

One or more embodiments of the present invention relates to the electronic apparatus according to the above-described embodiments, in which the first chassis has a first back surface located on a side opposite to the first facing surface, the second chassis has a second back surface located on a side opposite to the second facing surface, the posture of the chassis is switchable among the open posture, the closed posture, and a fully open posture in which the first back surface and the second back surface face each other, and in a case in which the posture of the chassis is the fully open posture, the first magnetic attraction portion and the second magnetic attraction portion are adjacent to each other in a direction in which the first back surface and the second back surface face each other.

One or more embodiments of the present invention can provide the electronic apparatus in which the attachment structure can be further improved.

One or more embodiments of the present invention relates to the electronic apparatus according to any one of the above-described embodiments, in which the first chassis is a display chassis having a display.

One or more embodiments of the present invention can provide the electronic apparatus in which the attachment structure can be improved even in a case in which it is difficult to dispose the first magnetic attraction portion having a large size in the first chassis, such as a case in which the first chassis has a narrow frame structure or the like.

One or more embodiments of the present invention can provide the electronic apparatus in which the attachment structure for attaching the pen-shaped device by the magnetic force can be improved.

DETAILED DESCRIPTION

Hereinafter, an electronic apparatus according to one or more embodiments of the present invention will be described.

Figure 1:
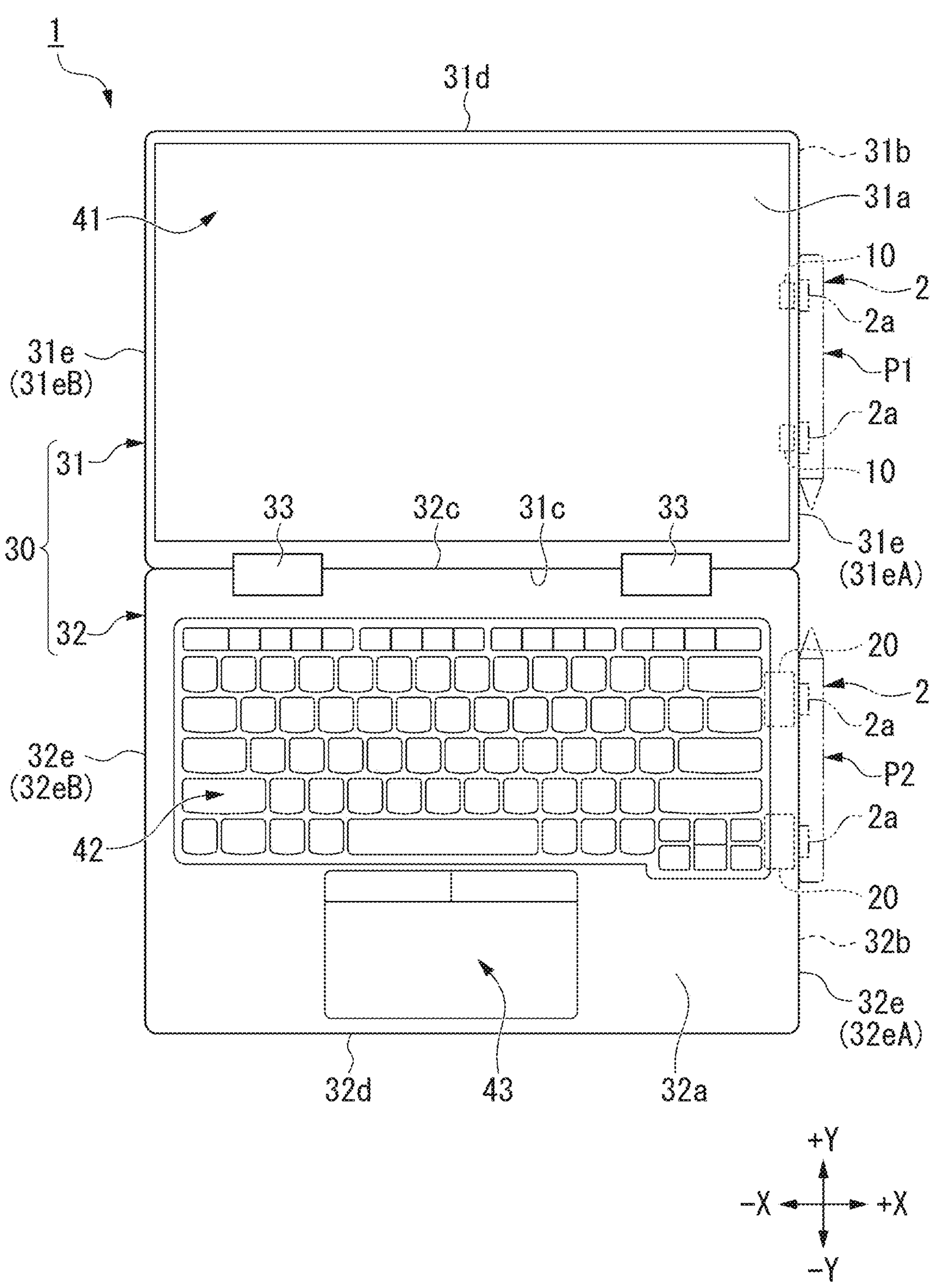
FIG. 1 is a view illustrating an electronic apparatus according to one or more embodiments of the present invention.

As illustrated in FIG. 1, an electronic apparatus 1 according to one or more embodiments includes a first magnetic attraction portion 10, a second magnetic attraction portion 20, and a chassis 30. The chassis 30 includes a first chassis 31 and a second chassis 32. In one or more embodiments, the first chassis 31 and the second chassis 32 are connected to each other by a hinge mechanism 33.

Figure 3A:
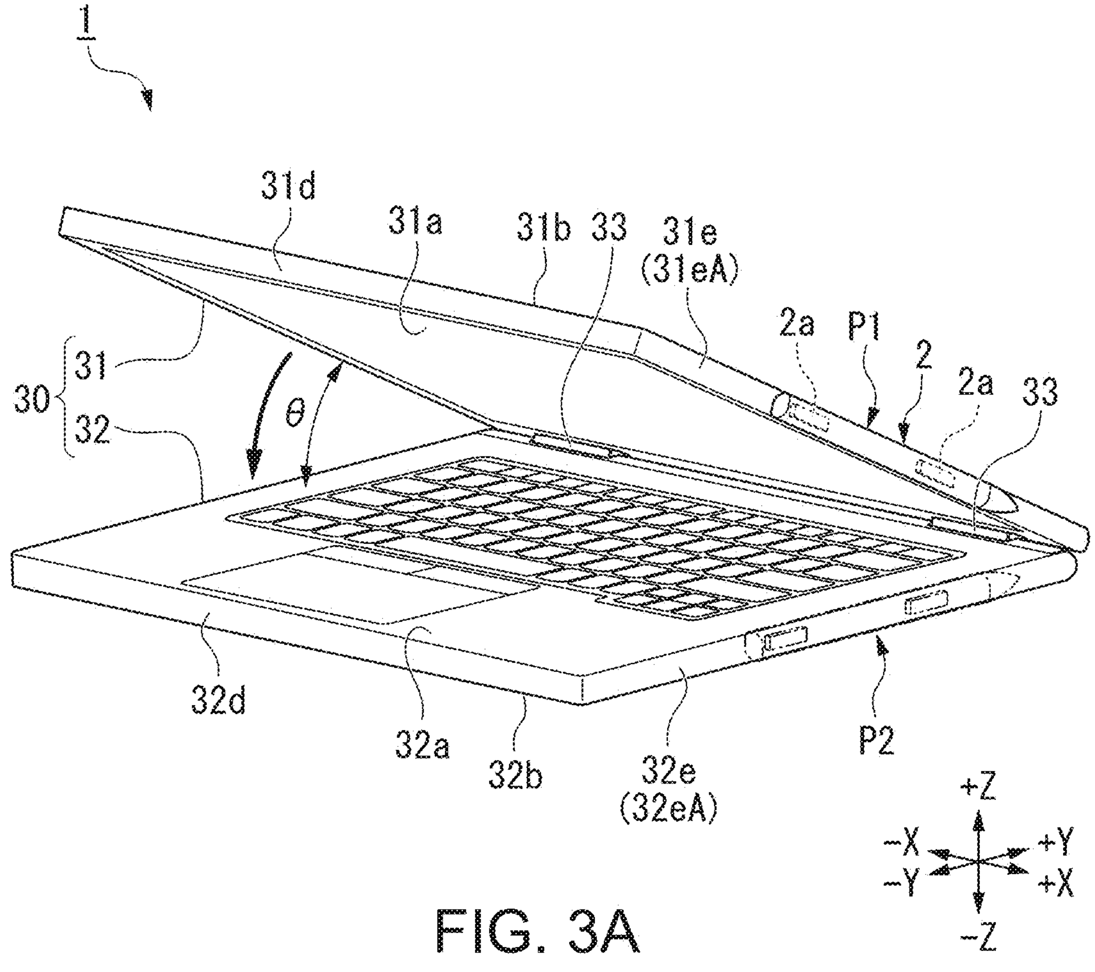
FIG. 3A is a view illustrating a state in which a posture of a chassis is an open posture and the pen-shaped device is magnetically attracted to a first attraction position.

The first chassis 31 has a flat box shape. The first chassis 31 has a first facing surface 31*a*, a first back surface 31*b*, a first connection end portion 31*c*, a first free end portion 31*d*, and two first side end portions 31*e* (first right side end portion 31*e*A and first left side end portion 31*e*B). The first back surface 31*b* is located on a side opposite to the first facing surface 31*a* (see also FIG. 3A). The first connection end portion 31*c*, the first right side end portion 31*e*A, the first free end portion 31*d*, and the first left side end portion 31*e*B are arranged in this order along an outer peripheral edge of the first facing surface 31*a*. The hinge mechanism 33 is connected to the first connection end portion 31*c*. The first free end portion 31*d* is located on a side opposite to the first connection end portion 31*c*. The two first side end portions 31*e* connect both end portions of the first free end portion 31*d* and both end portions of the first connection end portion 31*c*.

The first chassis 31 according to one or more embodiments is a display chassis having a display 41 and the like. In the illustrated example, the display 41 is located on the first facing surface 31*a* of the first chassis 31. The first chassis 31 may be formed of one member, or may be formed by combining two or more members.

The second chassis 32 has a flat box shape. The second chassis 32 has a second facing surface 32*a*, a second back surface 32*b*, a second connection end portion 32*c*, a second free end portion 32*d*, and two second side end portions 32*e* (second right side end portion 32*e*A and second left side end portion 32*e*B). The second back surface 32*b* is located on a side opposite to the second facing surface 32*a* (see also FIG. 3A). The second connection end portion 32*c*, the second right side end portion 32*e*A, the second free end portion 32*d*, and the second left side end portion 32*e*B are arranged in this order along an outer peripheral edge of the second facing surface 32*a*. The hinge mechanism 33 is connected to the second connection end portion 32*c*. The second free end portion 32*d* is located on a side opposite to the second connection end portion 32*c*. The two second side end portions 32*e* connect both end portions of the second free end portion 32*d* and both end portions of the second connection end portion 32*c*.

The second chassis 32 according to one or more embodiments is a base chassis having a keyboard 42, a touchpad 43, a motherboard (not illustrated), and the like. In the illustrated example, the keyboard 42 and the touchpad 43 are located on the second facing surface 32*a* of the second chassis 32. The second chassis 32 may be formed of one member, or may be formed by combining two or more members.

The hinge mechanism 33 connects the first chassis 31 and the second chassis 32 to each other in an openable and closable manner. That is, the hinge mechanism 33 connects the first chassis 31 and the second chassis 32 to each other such that a posture of the chassis 30 is switchable between an open posture and a closed posture.

Specifically, the hinge mechanism 33 connects the first chassis 31 and the second chassis 32 in a state in which an angle θ (see FIG. 3A) formed by the first facing surface 31*a* and the second facing surface 32*a* can be changed. The "closed posture" is a posture in which the first facing surface 31*a* of the first chassis 31 and the second facing surface 32*a* of the second chassis 32 face each other. In the closed posture, the first facing surface 31*a* and the second facing surface 32*a* are parallel to each other, and θ=0°. The "open posture" is a posture in which the first facing surface 31*a* of the first chassis 31 and the second facing surface 32*a* of the second chassis 32 do not face each other. In the open posture, the first facing surface 31*a* and the second facing surface 32*a* are not parallel to each other, and 0°<θ (<) 360°. In the open posture, the first back surface 31*b* and the second back surface 32*b* do not face each other and are not parallel to each other.

In addition, the hinge mechanism 33 may connect the first chassis 31 and the second chassis 32 such that the chassis 30 can take a fully open posture in addition to the open posture and the closed posture. The "fully open posture" is a posture in which the first back surface 31*b* of the first chassis 31 and the second back surface 32*b* of the second chassis 32 face each other. That is, in the fully open posture, the first back surface 31*b* and the second back surface 32*b* are parallel to each other, and θ=360°. However, the chassis 30 need not take the fully open posture. That is, the maximum value of 0 may be smaller than 360°.

The electronic apparatus 1 according to one or more embodiments is a clamshell-type or 2-in-1 type laptop PC, but other types of electronic apparatus 1 may be adopted. For example, the electronic apparatus 1 may be a foldable smartphone, a game machine, and the like.

Hereinafter, a direction in which the second right side end portion 32*e*A and the second left side end portion 32*e*B are arranged in the second chassis 32 may be referred to as a first direction X. Similarly, a direction in which the second connection end portion 32*c* and the second free end portion 32*d* are arranged in the second chassis 32 may be referred to as a second direction Y. The first direction X and the second direction Y may be directions parallel to the first facing surface 31*a*. Further, a direction intersecting (for example, orthogonal to) the second facing surface 32*a* may be referred to as a third direction Z. The third direction Z may be a thickness direction of the second chassis 32.

The first magnetic attraction portion 10 is provided in the first chassis 31. The first magnetic attraction portion 10 may be, for example, a permanent magnet. The first magnetic attraction portion 10 may be accommodated in the first chassis 31. The first magnetic attraction portion 10 in the illustrated example is located at the first right side end portion 31*e*A of the first chassis 31. In the illustrated example, two first magnetic attraction portions 10 are arranged at an interval along the first right side end portion 31*e*A.

The second magnetic attraction portion 20 is provided in the second chassis 32. The second magnetic attraction portion 20 may be, for example, a permanent magnet. The second magnetic attraction portion 20 may be accommodated in the second chassis 32. The second magnetic attraction portion 20 in the illustrated example is located at the second right side end portion 32*e*A of the second chassis 32. In the illustrated example, two second magnetic attraction portions 20 are arranged at an interval along the second right side end portion 32*e*A. The interval between the second magnetic attraction portions 20 is substantially equal to the interval between the first magnetic attraction portions 10. The expression "substantially equal" includes a case in which the intervals are considered to be equal except for a manufacturing error. The same applies to the following description.

The electronic apparatus 1 according to one or more embodiments has a configuration in which the pen-shaped device 2 can be attached to any one of a first attraction position P1 and a second attraction position P2 by the magnetic forces generated by the above-described magnetic attraction portions 10 and 20. Specifically, the first magnetic attraction portion 10 magnetically attracts the pen-shaped device 2 to the first attraction position P1. The second magnetic attraction portion 20 magnetically attracts the pen-shaped device 2 to the second attraction position P2. The first attraction position P1 is located on the first chassis 31 (first right side end portion 31*e*A in the illustrated example). The second attraction position P2 is located on the second chassis 32 (second right side end portion 32*e*A in the illustrated example).

The pen-shaped device 2 is a device for inputting information to the electronic apparatus 1. The pen-shaped device 2 may be, for example, a stylus pen. The electronic apparatus 1 and the pen-shaped device 2 may be collectively referred to as an "electronic apparatus with a pen-shaped device".

Figure 2:
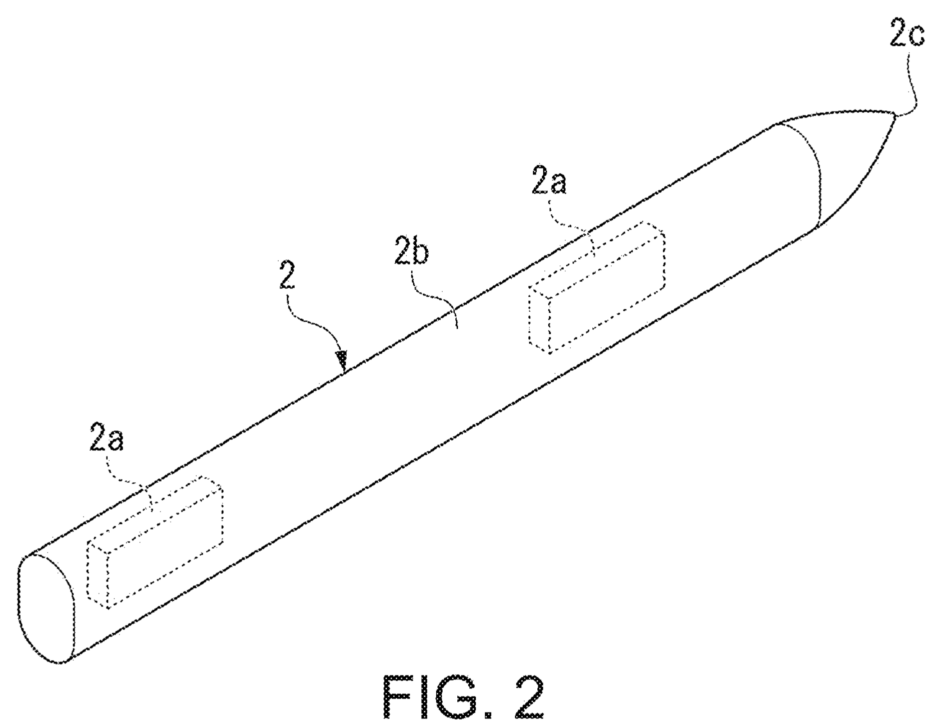
FIG. 2 is a view illustrating a pen-shaped device according to one or more embodiments of the present invention.

As illustrated in FIG. 2, the pen-shaped device 2 includes a pen chassis 2*b*. The pen chassis 2*b* accommodates various components (not illustrated) provided in the pen-shaped device 2. The pen chassis 2*b* is also a portion held by a user in the pen-shaped device 2. A pen tip 2*c* is provided at a distal end of the pen chassis 2*b*. The pen tip 2*c* inputs information according to an operation of the user to the display 41 of the electronic apparatus 1 by using, for example, static electricity or the like.

The pen-shaped device 2 according to one or more embodiments includes a pen side magnetic attraction portion 2*a*. The pen side magnetic attraction portion 2*a* is accommodated in, for example, the pen chassis 2*b*. The pen side magnetic attraction portion 2*a* may be, for example, a permanent magnet. In the illustrated example, two pen side magnetic attraction portions 2*a* of the pen-shaped device 2 are arranged at an interval along a longitudinal direction of the pen-shaped device. The interval between the pen side magnetic attraction portions 2*a* is substantially equal to the interval between the first magnetic attraction portions 10 and the interval between the second magnetic attraction portions 20. The pen-shaped device 2 is magnetically attracted to the first attraction position P1 of the first chassis 31 by the magnetic force acting between the pen side magnetic attraction portion 2*a* and the first magnetic attraction portion 10. The pen-shaped device 2 is magnetically attracted to the second attraction position P2 of the second chassis 32 by the magnetic force acting between the pen side magnetic attraction portion 2*a* and the second magnetic attraction portion 20.

Figure 3B:
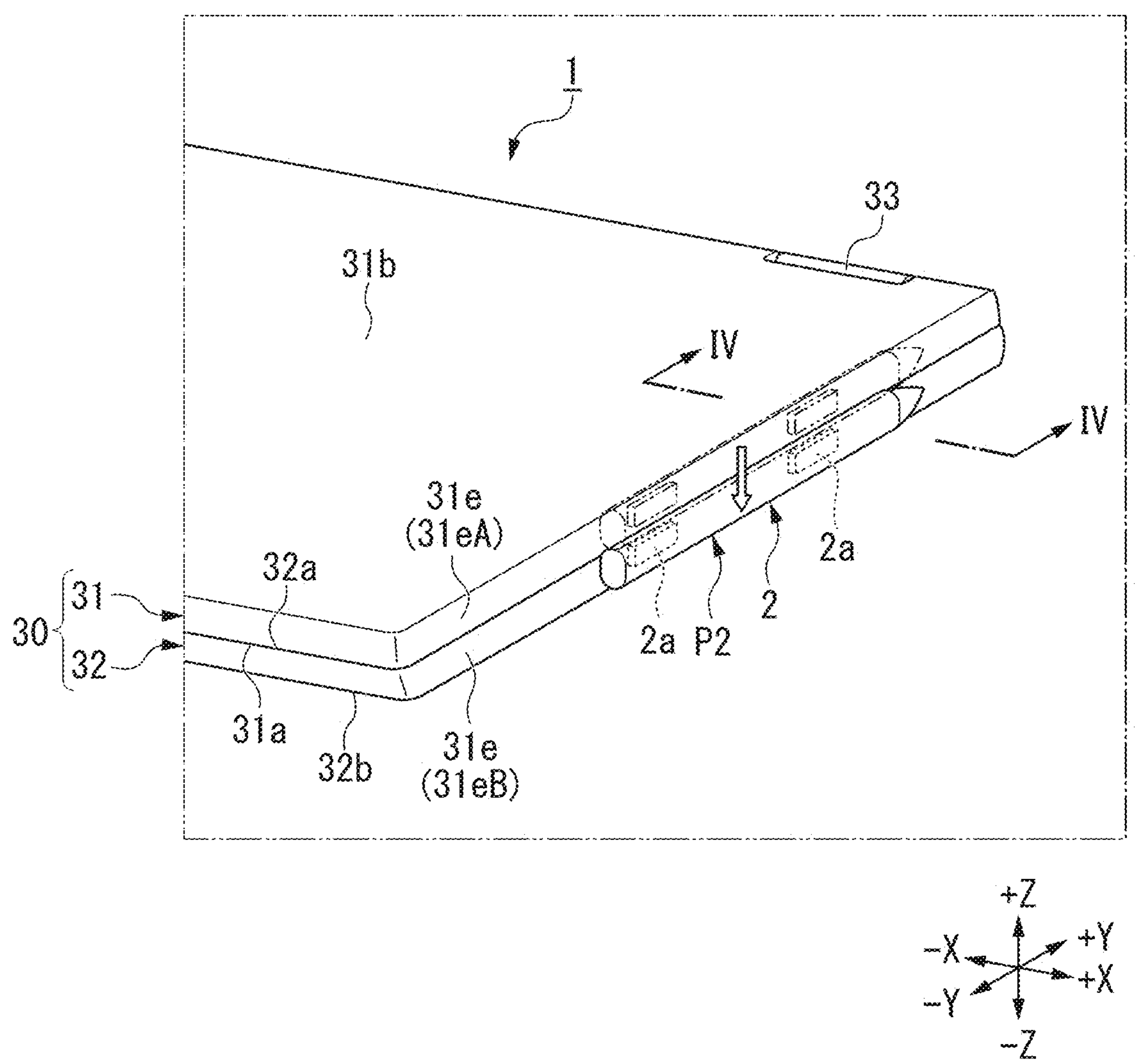
FIG. 3B is a view illustrating a state subsequent to FIG. 3A.

The electronic apparatus 1 according to one or more embodiments has a configuration in which, in a case in which the posture of the chassis 30 is changed from the open posture to the closed posture in a state in which the pen-shaped device 2 is magnetically attracted to the first attraction position P1 (see FIG. 3A), the pen-shaped device 2 leaves the first attraction position P1 and moves to the second attraction position P2 (see FIG. 3B). In other words, the position, the magnetic force, and the like of each of the magnetic attraction portions 10 and 20 are set such that the pen-shaped device 2 moves from the first attraction position P1 to the second attraction position P2 in a case in which the chassis 30 is closed. Hereinafter, the positions and the magnetic forces of the magnetic attraction portions 10 and 20 according to one or more embodiments will be specifically described.

Figure 4:
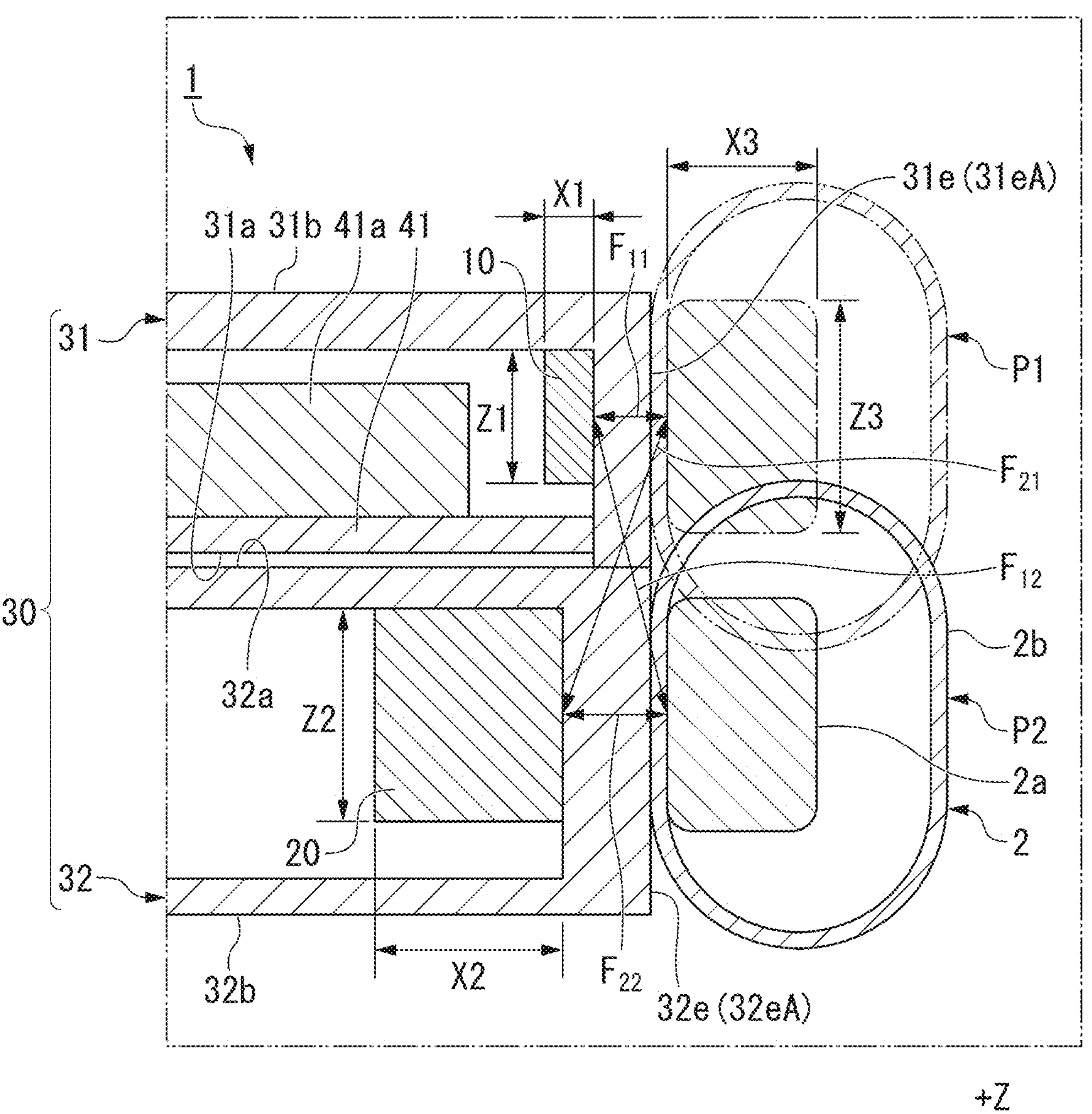
FIG. 4 is a cross-sectional view taken along a line IV-IV illustrated in FIG. 3B.
Figure 5:
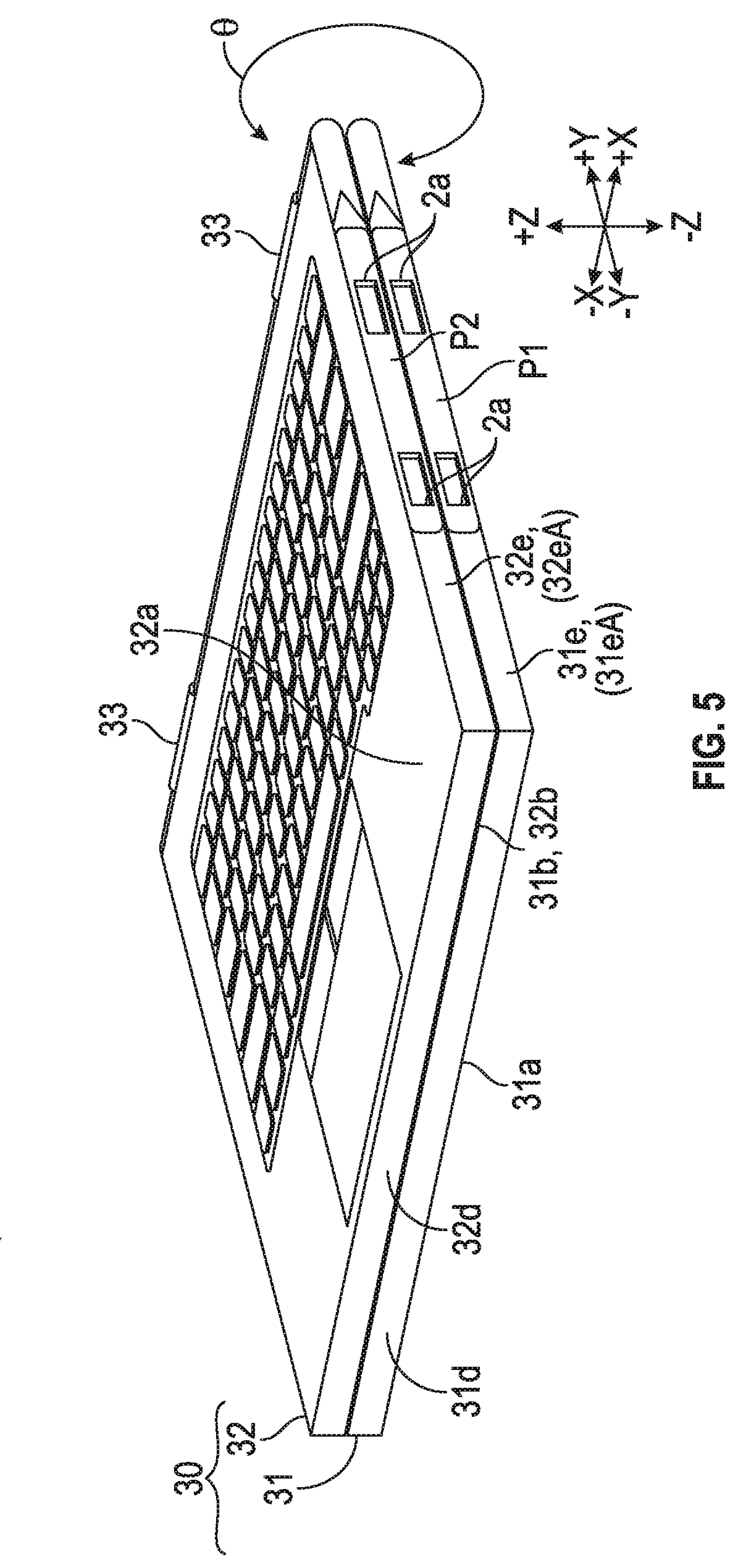
FIG. 5 is a view illustrating a case in which a posture of a chassis is in a fully open posture in which a first back surface and a second back surface face each other.
Figure 6:
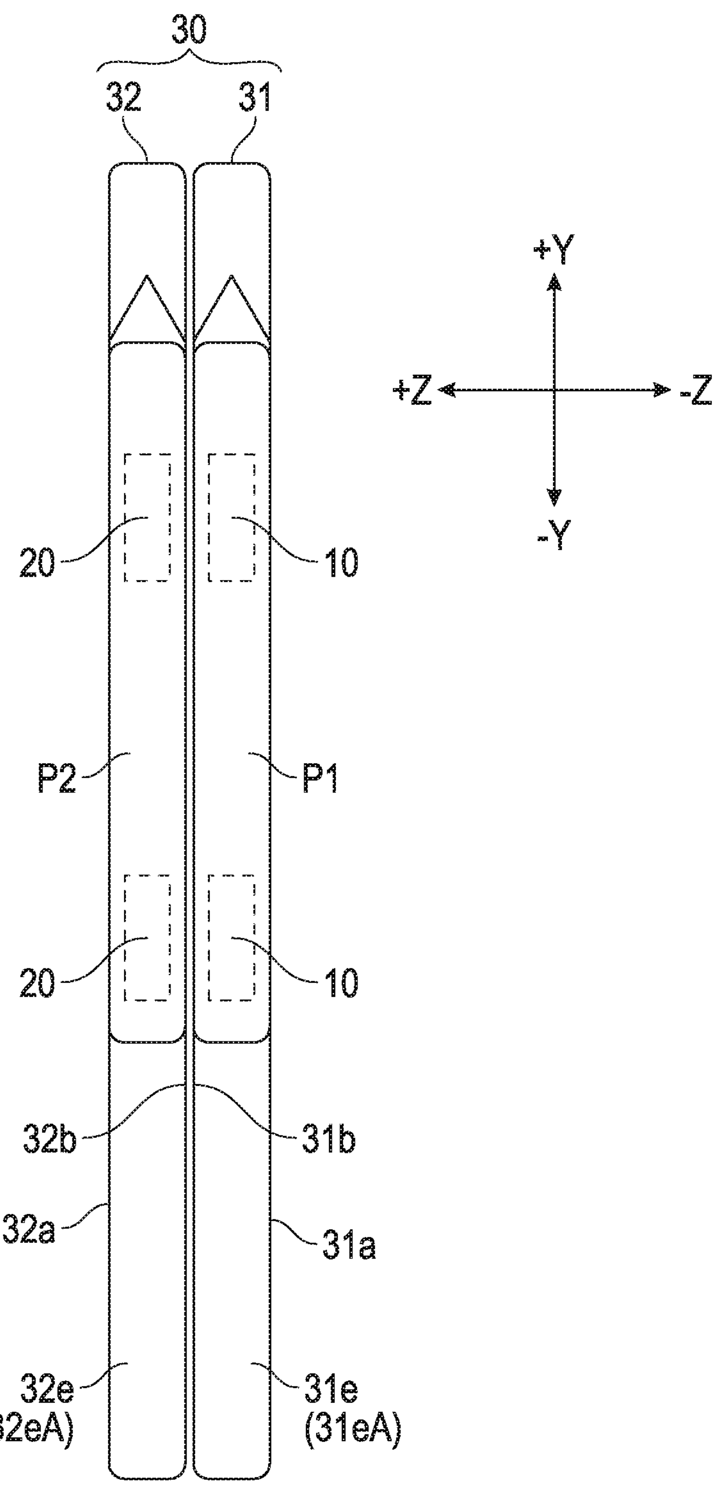
FIG. 6 is a view illustrating a case in which a posture of a chassis is in a fully open posture where a first magnetic attraction portion and a second magnetic attraction portion are adjacent to each other in a direction in which a first back surface and a second back surface face each other.

As illustrated in FIG. 4, in a case in which the posture of the chassis 30 is the closed posture, the first magnetic attraction portion 10 and the second magnetic attraction portion 20 according to one or more embodiments are adjacent to each other in a direction (that is, the third direction Z) in which the first facing surface 31*a* and the second facing surface 32*a* face each other. The magnetic force generated by the second magnetic attraction portion 20 (magnetic force acting between the second magnetic attraction portion 20 and the pen side magnetic attraction portion 2*a*) is larger than the magnetic force generated by the first magnetic attraction portion 10 (magnetic force acting between the first magnetic attraction portion 10 and the pen side magnetic attraction portion 2*a*).

More specifically, the following expressions (1) and (2) are satisfied for magnetic forces $F_{11}$, $F_{12}$, $F_{21}$, and $F_{22}$ acting between the magnetic attraction portions 10 and 20, and the pen side magnetic attraction portion 2*a*. Fu is a magnitude of the magnetic force acting between the first magnetic attraction portion 10 and the pen side magnetic attraction portion 2*a* in a case in which the pen-shaped device 2 is at the first attraction position P1. $F_{12}$ is a magnitude of the magnetic force acting between the first magnetic attraction portion 10 and the pen side magnetic attraction portion 2*a* in a case in which the pen-shaped device 2 is at the second attraction position P2. $F_{21}$ is a magnitude of the magnetic force acting between the second magnetic attraction portion 20 and the pen side magnetic attraction portion 2*a* in a case in which the pen-shaped device 2 is at the first attraction position P1. $F_{22}$ is a magnitude of the magnetic force acting between the second magnetic attraction portion 20 and the pen side magnetic attraction portion 2*a* in a case in which the pen-shaped device 2 is at the second attraction position P2. The magnitude of the magnetic force Fu is set to be, for example, equal to or larger than 200 gf. The magnitude of the magnetic force $F_{22}$ is set to be, for example, equal to or larger than 420 gf.

$$F_{11}<F_{21} \quad (1)$$

$$F_{22}>F_{12} \quad (2)$$

Dimensions of the magnetic attraction portions 10, 20, and 2*a* may be set such that the above-described expressions (1) and (2) are satisfied. For example, a size of the second magnetic attraction portion 20 may be larger than a size of the first magnetic attraction portion 10. More specifically, in a cross-sectional view perpendicular to the second direction Y (hereinafter, simply referred to as a "cross-sectional view"), a cross-sectional area of the second magnetic attraction portion 20 may be larger than a cross-sectional area of the first magnetic attraction portion 10. For example, in a case in which the magnetic attraction portions 10, 20, and 2*a* having a rectangular shape in a cross-sectional view are used, the dimensions of the magnetic attraction portions 10, 20, and 2*a* are set as follows, so that the above-described expressions (1) and (2) can be satisfied. However, the dimensions of the magnetic attraction portions 10, 20, and 2*a* are not limited to the following examples and can be appropriately changed. The shapes of the magnetic attraction portions 10, 20, and 2*a* can also be appropriately changed.

Dimension X1 of first magnetic attraction portion 10 in first direction X: 1.0 mm Dimension Z1 of first magnetic attraction portion 10 in third direction Z: 2.7 mm Dimension X2 of second magnetic attraction portion 20 in first direction X: 3.7 mm Dimension Z2 of second magnetic attraction portion 20 in third direction Z: 4.3 mm Dimension X3 of pen side magnetic attraction portion 2*a* in first direction X: 3.0 mm Dimension Z3 of pen side magnetic attraction portion 2*a* in third direction Z: 5.3 mm In addition, the electronic apparatus 1 according to one or more embodiments has a configuration in which, in a case in which the posture of the chassis 30 is changed from the open posture to the fully open posture in a state in which the pen-shaped device 2 is magnetically attracted to the first attraction position P1, the pen-shaped device 2 leaves the first attraction position P1 and moves to the second attraction position P2 (details are not illustrated). In other words, the position and the like of each of the magnetic attraction portions 10 and 20 are set such that the pen-shaped device 2 moves from the first attraction position P1 to the second attraction position P2 in a case in which the chassis 30 is fully opened. Specifically, in a case in which the posture of the chassis 30 is the fully open posture, the first magnetic attraction portion 10 and the second magnetic attraction portion 20 according to one or more embodiments are adjacent to each other in a direction (that is, the third direction Z) in which the first back surface 31*b* and the second back surface 32*b* face each other (details are not illustrated).

Next, actions of the electronic apparatus 1 configured as described above will be described.

In the electronic apparatus 1 according to one or more embodiments, the user can properly use the first attraction position P1 and the second attraction position P2, depending on the application. Specifically, the user can use the first attraction position P1 as a temporary position at which the pen-shaped device 2 is temporarily attached during the use of the electronic apparatus 1. On the other hand, the user can use the second attraction position P2 as a carry position at which the pen-shaped device 2 is attached in a case of carrying the electronic apparatus 1. Hereinafter, the temporary position and the carry position will be specifically described.

The electronic apparatus 1 is used, for example, in a state of being placed on a desk or the like (that is, in a state in which the second back surface 32*b* is in contact with the desk or the like). In this case, the second attraction position P2 (second chassis 32) is close to the desk. Therefore, in a case in which the user tries to pick up the pen-shaped device 2 attracted to the second attraction position P2 while using the electronic apparatus 1, a finger of the user may come into contact with the desk or the like, and it may be difficult to pick up the pen-shaped device 2. In addition, in a case in which a USB cable or the like is inserted into the second chassis 32, the cable or the like may interfere with the second attraction position P2, and the pen-shaped device 2 may not be attachable.

On the other hand, the first chassis 31 (first attraction position P1) is separated from the desk or the like even during the use of the electronic apparatus 1. Therefore, the user can easily hold and pick up the pen-shaped device 2 attracted to the first attraction position P1. In addition, even in a case in which the USB cable or the like is inserted into the second chassis 32, the pen-shaped device 2 can be attached to the first attraction position P1. In addition, the first chassis 31 (first attraction position P1) is located in front of the user during the use of the electronic apparatus 1. Therefore, the user can easily attach and detach the pen-shaped device 2 to and from the first attraction position P1 during the use of the electronic apparatus 1.

On the other hand, in recent years, it is required to realize a narrow frame structure in the laptop PC or the like. That is, it is required to reduce a width of a bezel surrounding the display 41. In such a narrow frame structure, as illustrated in FIG. 4, a gap between the display 41 (or a display control unit 41*a* that controls display of the display 41) and the first chassis 31 tends to be small. In a case in which the gap between the display 41 (display control unit 41*a*) and the first chassis 31 is small, it is difficult to provide the first magnetic attraction portion 10 having a large size in the first chassis 31. This means that it is difficult to dispose the first magnetic attraction portion 10 having a large magnetic force in the first chassis 31. That is, the magnetic force of the first magnetic attraction portion 10 disposed in the first chassis 31 is likely to be reduced. Therefore, for example, in a case in which the user carries the electronic apparatus 1 while the pen-shaped device 2 is attracted to the first attraction position P1, the pen-shaped device 2 may leave the first attraction position P1 and fall off from the electronic apparatus 1.

Therefore, in the electronic apparatus 1 according to one or more embodiments, the second magnetic attraction portion 20 that generates the magnetic force larger than that of the first magnetic attraction portion 10 is provided in the second chassis 32. In the second chassis 32, a problem such as the narrow frame structure in the first chassis 31 is less likely to occur, and the second magnetic attraction portion 20 having a large size (that is, a large magnetic force) can be disposed. In a case of carrying the electronic apparatus 1 or the like, the pen-shaped device 2 can be prevented from falling off from the electronic apparatus 1 by attracting the pen-shaped device 2 to the second attraction position P2. In addition, in the electronic apparatus 1 according to one or more embodiments, the pen-shaped device 2 automatically moves from the first attraction position P1 to the second attraction position P2 by putting the chassis 30 into the closed posture (or the fully open posture). Therefore, it is not necessary for the user to attract the pen-shaped device 2 to the second attraction position P2 before carrying the electronic apparatus 1. As a result, the convenience of the electronic apparatus 1 can be improved.

As described above, the electronic apparatus 1 according to one or more embodiments includes the chassis 30 including the first chassis 31 having the first facing surface 31*a* and the second chassis 32 having the second facing surface 32*a*, the first magnetic attraction portion 10 provided in the first chassis 31 and configured to magnetically attract the pen-shaped device 2 to the first attraction position P1 of the first chassis 31, the second magnetic attraction portion 20 provided in the second chassis 32 and configured to magnetically attract the pen-shaped device 2 to the second attraction position P2 of the second chassis 32, in which the posture of the chassis 30 is switchable between the closed posture in which the first facing surface 31*a* and the second facing surface 32*a* face each other and the open posture in which the first facing surface 31*a* and the second facing surface 32*a* do not face each other, and in a case in which the posture of the chassis 30 is changed from the open posture to the closed posture in a state in which the pen-shaped device 2 is magnetically attracted to the first attraction position P1, the pen-shaped device 2 leaves the first attraction position P1 and moves to the second attraction position P2. That is, the magnetic force generated by the second magnetic attraction portion 20 is larger than the magnetic force generated by the first magnetic attraction portion 10, and in a case in which the posture of the chassis 30 is the closed posture, the first magnetic attraction portion 10 and the second magnetic attraction portion 20 are adjacent to each other in a direction in which the first facing surface 31*a* and the second facing surface 32*a* face each other.

With this configuration, it is possible to provide the electronic apparatus 1 in which the attachment structure for attaching the pen-shaped device 2 by the magnetic force can be improved. More specifically, the electronic apparatus 1 having both the temporary position at which the pen-shaped device 2 is temporarily attached during the use of the electronic apparatus 1 and the carry position at which the pen-shaped device 2 is attached in a case of carrying the electronic apparatus 1 can be realized. In addition, the chassis 30 is put into the closed posture, so that the pen-shaped device 2 automatically moves from the temporary position to the carry position. Therefore, the convenience of the electronic apparatus 1 can be improved.

The first chassis 31 has the first back surface 31*b* located on a side opposite to the first facing surface 31*a*, the second chassis 32 has the second back surface 32*b* located on a side opposite to the second facing surface 32*a*, the posture of the chassis 30 is switchable among the open posture, the closed posture, and the fully open posture in which the first back surface 31*b* and the second back surface 32*b* face each other, and in a case in which the posture of the chassis 30 is changed from the open posture to the fully open posture in a state in which the pen-shaped device 2 is magnetically attracted to the first attraction position P1, the pen-shaped device 2 leaves the first attraction position P1 and moves to the second attraction position P2. That is, in a case in which the posture of the chassis 30 is the fully open posture, the first magnetic attraction portion 10 and the second magnetic attraction portion 20 are adjacent to each other in a direction in which the first back surface 31*b* and the second back surface 32*b* face each other.

With this configuration, it is possible to provide the electronic apparatus 1 in which the attachment structure can be further improved. More specifically, the pen-shaped device 2 automatically moves from the temporary position to the carry position by putting the chassis 30 into the fully open posture. Therefore, in the electronic apparatus 1 in which the chassis 30 can take the fully open posture, the convenience of the electronic apparatus 1 can be further improved.

In addition, the first chassis 31 is the display chassis having the display 41. According to one or more embodiments, it is possible to provide the electronic apparatus 1 in which the attachment structure can be improved even in a case in which it is difficult to dispose the first magnetic attraction portion 10 having a large size in the first chassis 31, such as a case in which the first chassis 31 has a narrow frame structure or the like.

The technical scope of the present invention is not limited to the above-described embodiments, and various modifications can be made within the scope of the present invention without departing from the spirit of the present invention.

For example, in the above-described embodiments, the attraction positions P1 and P2 are located at the right side end portions 31*e*A and 32*e*A of the respective chassis 31 and 32, but the attraction positions P1 and P2 are not limited to this, and can be appropriately changed. For example, the attraction positions P1 and P2 may be located at the left end portions 31*e*B and 32*e*B of the respective chassis 31 and 32. Alternatively, the attraction positions P1 and P2 may be located on the free end portions 31*d* and 32*d* of the respective chassis 31 and 32, and the like.

In addition, the first chassis 31 may be the base chassis, and the second chassis 32 may be the display chassis. That is, the first attraction position P1 (temporary position) may be provided in the base chassis, and the second attraction position P2 (carry position) may be provided in the display chassis. In other words, in a case in which the chassis 30 is put into the closed posture (or the fully open posture), the pen-shaped device 2 may move from the base chassis to the display chassis.

In addition, the first magnetic attraction portion 10 need not be accommodated in the first chassis 31, and may be exposed on a surface of the first chassis 31. Similarly, the second magnetic attraction portion 20 may be exposed on a surface of the second chassis 32. The pen side magnetic attraction portion 2*a* may be exposed on a surface of the pen chassis 2*b*.

In addition, in a case in which each of the magnetic attraction portions 10 and 20 can magnetically attracts the pen side magnetic attraction portion 2*a*, the configurations of the magnetic attraction portions 10, 20, and 2*a* can be appropriately changed. For example, at least one of the magnetic attraction portions 10, 20, and 2*a* may be a magnetic body such as iron or the like. The pen chassis 2*b* may function as the pen side magnetic attraction portion 2*a*. Alternatively, at least one of the magnetic attraction portions 10, 20, and 2*a* may be an electromagnet or the like.

In a case in which the posture of the chassis 30 is switchable between the open posture and the closed posture, the configuration of the chassis 30 can be appropriately changed. For example, the chassis 30 may have a configuration in which the first chassis 31 and the second chassis 32 slidably move in a direction parallel to the second facing surface 32*a*. In this case, the electronic apparatus 1 need not include the hinge mechanism 33. The first chassis 31 and the second chassis 32 may be attachable to and detachable from each other.

In addition, the components in the above-described embodiments can be replaced with well-known components within a range not departing from the spirit of the present invention, and the above-described embodiments or the modification examples thereof may be combined as appropriate.

DESCRIPTION OF SYMBOLS

1 electronic apparatus
2 pen-shaped device
10 first magnetic attraction portion

20 second magnetic attraction portion
30 chassis
31 first chassis
31*a* first facing surface
31*b* first back surface
32*a* second facing surface
32*b* second back surface
P1 first attraction position
P2 second attraction position

What is claimed is:

1. An electronic apparatus comprising:

a chassis including a first chassis having a display and a second chassis having a keyboard;

a first magnetic attraction portion provided in the first chassis and configured to magnetically attract a pen-shaped device to a first attraction position of the first chassis; and a second magnetic attraction portion provided in the second chassis and configured to magnetically attract the pen-shaped device to a second attraction position of the second chassis, the second magnetic attraction portion having a stronger magnetic attraction force than the first magnetic attraction portion, wherein the first chassis and the second chassis are rotatably connected to each other, and when the first chassis and the second chassis are rotated to a closed posture in which the first chassis is adjacent to the second chassis along a thickness direction of the first chassis and the second chassis, the first attraction position and the second attraction position are arranged adjacent to each other along the thickness direction.

2. The electronic apparatus according to claim 1, wherein the first chassis has a first back surface located on a side opposite to the display, the second chassis has a second back surface located on a side opposite to the keyboard, a posture of the chassis is switchable among an open posture, the closed posture, and a fully open posture in which the first back surface and the second back surface face each other.

3. An electronic apparatus comprising:

a chassis including a first chassis having a first facing surface and a second chassis having a second facing surface;

a first magnetic attraction portion provided in the first chassis and configured to generate a magnetic force; and a second magnetic attraction portion provided in the second chassis and configured to generate a magnetic force, wherein a posture of the chassis is switchable between a closed posture in which the first facing surface and the second facing surface face each other and an open posture in which the first facing surface and the second facing surface do not face each other, the magnetic force generated by the second magnetic attraction portion is stronger than the magnetic force generated by the first magnetic attraction portion, and in the closed posture, the first magnetic attraction portion and the second magnetic attraction portion are next to each other in a direction in which the first facing surface and the second facing surface face each other.

4. The electronic apparatus according to claim 3, wherein the first chassis has a first back surface located on a side opposite to the first facing surface, the second chassis has a second back surface located on a side opposite to the second facing surface, the posture of the chassis is switchable among the open posture, the closed posture, and a fully open posture in which the first back surface and the second back surface face each other, and in the fully open posture, the first magnetic attraction portion and the second magnetic attraction portion are next to each other in a direction in which the first back surface and the second back surface face each other.

5. The electronic apparatus according to claim 3, wherein the first chassis is a display chassis having a display.

* * * * *